United States Patent [19]

Imahori et al.

[11] Patent Number: 4,482,490

[45] Date of Patent: Nov. 13, 1984

[54] N-(P-NITROPHENYL)-N'-(4-AMINO-2-FLUOROTRIAZINEAMINO PHENYL)-1,4-DISAZOPHENYLENE DYES

[75] Inventors: Seiichi Imahori, Kawasaki; Toshio Niwa; Itaru Okada, both of Yokohama; Kuninori Sato, Sagamihara, all of Japan

[73] Assignee: Mitsubishi Chemical Industries, Limited, Japan

[21] Appl. No.: 447,476

[22] Filed: Dec. 6, 1982

Related U.S. Application Data

[63] Continuation of Ser. No. 337,319, Jan. 5, 1982, abandoned, which is a continuation of Ser. No. 109,055, Jan. 2, 1980, abandoned.

[30] Foreign Application Priority Data

Jan. 26, 1979 [JP] Japan .................................... 54-7750

[51] Int. Cl.³ .................... C09B 62/08; C09B 62/09; D06P 1/382; D06P 3/66
[52] U.S. Cl. ................................... 534/797; 544/208; 544/218
[58] Field of Search .................................... 260/153

[56] References Cited

U.S. PATENT DOCUMENTS

| | | | |
|---|---|---|---|
| 3,627,749 | 12/1971 | Ackermann et al. | 260/153 |
| 3,658,783 | 4/1972 | Knobloch et al. | 260/153 |
| 3,945,989 | 3/1976 | Angliker et al. | 260/153 |
| 3,966,705 | 6/1976 | Oesterlein et al. | 260/153 |
| 3,974,160 | 8/1976 | Seiler et al. | 260/153 X |
| 4,049,661 | 9/1977 | Seiler et al. | 260/153 X |
| 4,115,378 | 9/1978 | Bien et al. | 260/153 X |

FOREIGN PATENT DOCUMENTS

| | | | |
|---|---|---|---|
| 7008951 | 12/1970 | Netherlands | 260/153 |
| 1267940 | 3/1972 | United Kingdom | 260/153 |
| 1323157 | 7/1973 | United Kingdom | 260/153 |

OTHER PUBLICATIONS

Ven Kataraman, K., K., The Chemistry of Synthetic Dyes, vol. I, Chapter 8 pp. 323-324 and Chapter 11 pp. 452-463, (1952).

Primary Examiner—Floyd D. Higel
Attorney, Agent, or Firm—Jordan B. Bierman

[57] ABSTRACT

Disazo dyes for dyeing cellulose-containing fibers, particularly fibers having both cellulose and polyester, of the formula

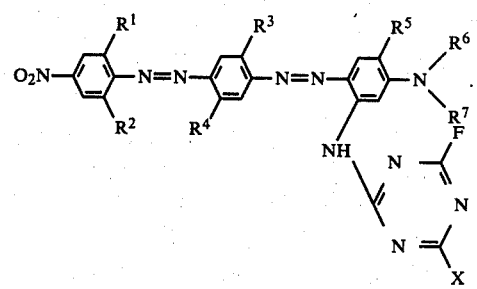

Mixed fibers dyed with the dyes of the invention result in surprisingly more uniform color than previously obtainable. In the above formula $R^1$ and $R^2$ are independently selected from H, halogen, nitro, cyano, trifluoromethyl, lower alkoxycarbonyl, lower alkyl, and lower alkoxy; $R^3$, $R^4$, and $R^5$, are independently selected from H, halogen, lower alkyl, lower alkoxy, lower alkoxy-lower alkoxy, and acylamino; $R^6$ and $R^7$ are independently selected from H, allyl, aralkyl, and lower alkyl which may be further substituted with halogen, cyano, lower alkoxy, lower alkoxycarbonyl, OH, and acyloxy; and X is selected from amino, mono- or dialkylamino having a total of 1-6 carbon atoms, anilino, lower alkoxy and $-O-(R^8O)_n-R^9$, wherein $R^8$ is ethylene or propylene, $R^9$ is methyl or ethyl, and n is 1-5.

1 Claim, No Drawings

N-(P-NITROPHENYL)-N'-(4-AMINO-2-FLUORO-TRIAZINEAMINO PHENYL)-1,4-DISAZOPHENYLENE DYES

This application is a Continuation of Application No. 337,319, filed Jan. 5, 1982, now abandoned, which is a Continuation of Application No. 109,055, filed Jan. 2, 1980, now abandoned, which, in turn, claims priority of Japanese Application No. 7750/79, filed Jan. 26, 1979.

BACKGROUND OF THE INVENTION

This invention relates to disazo dyes for cellulose-containing fibers. More particularly, it relates to reactive disazo dyes for dyeing cellulose-containing fibers, particularly cellulose fibers or mixed fibers of polyester fibers and cellulose fibers, fast blue in color.

SUMMARY OF THE INVENTION

It is an object of the present invention to provide novel disazo dye for cellulose-containing fibers.

The dyes according to the invention are water-insoluble, reactive disazo dyes represented by the following general formula (I)

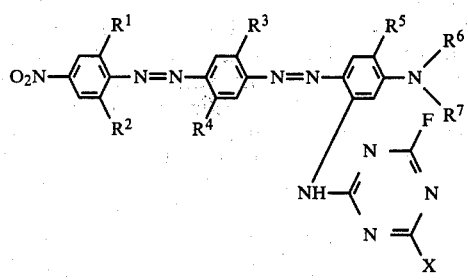

(in which $R^1$ and $R^2$ independently represent a hydrogen atom, a halogen atom, a nitro group, a cyano group, a trifluoromethyl group, a lower alkoxycarbonyl group, a lower alkyl group, or a lower alkoxy group, $R^3$, $R^4$ and $R^5$ independently represent a hydrogen atom, a halogen atom, a lower alkyl group, a lower alkoxy group, a lower alkoxy-lower alkoxy group, or an acylamino group, $R^6$ and $R^7$ independently represent a hydrogen atom, an allyl group, an aralkyl group, or a lower alkyl group which may be substituted with a halogen atom, a cyano group, a lower alkoxy group, a lower alkoxycarbonyl group, a hydroxy group or an acyloxy group, and X represents an amino group, a mono- or di-alkylamino group having 1-6 carbon atoms in total, an anilino group, a lower alkoxy group or a —O—($R^8$O)$_n$–$R^9$ group (in which $R^8$ represents an ethylene group or a propylene group, $R^9$ represents a methyl group or an ethyl group, and n is an integer of 1-5)).

DETAILED DESCRIPTION OF THE PREFERRED EMBODIMENTS

The dyes of the general formula (I) are obtainable, for example, by subjecting diazonium salts of 4-aminoazobenzenes represented by the following general formula (II)

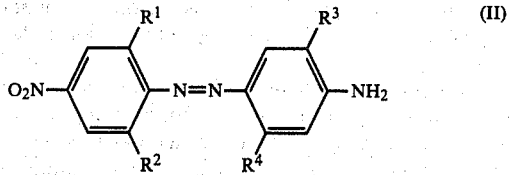

(in which $R^1$, $R^2$, $R^3$ and $R^4$ have, respectively, the same meanings as defined in the general formula (I)) to coupling reaction with anilines represented by the following general formula (III)

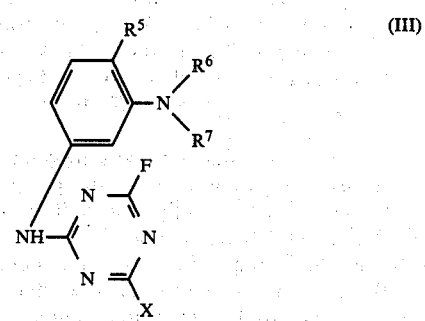

(in which $R^5$, $R^6$, $R^7$ and X have, respectively, the same meanings as defined in the general formula (I)).

The halogen atoms represented by $R^1$, $R^2$, $R^3$, $R^4$ and $R^5$ in the general formula (I) include a chlorine atom, a bromine atom, etc. The lower alkoxycarbonyl groups represented by $R^1$ and $R^2$ include a methoxycarbonyl group, an ethoxycarbonyl group, a propoxycarbonyl group, a butoxycarbonyl group, etc. The lower alkyl groups represented by $R^1$, $R^2$, $R^3$, $R^4$ and $R^5$ include a methyl group, an ethyl group, and a linear or branched propyl group, butyl group, pentyl group and hexyl group. The lower alkoxy groups represented by $R^1$, $R^2$, $R^3$, $R^4$, $R^5$ and X include a methoxy group, an ethoxy group, a propoxy group, a butoxy group, etc. The lower alkoxy-lower alkoxy groups represented by $R^3$, $R^4$ and $R^5$ include a β-methoxyethoxy group, a β-ethoxyethoxy group, a γ-methoxypropoxy group, etc. The acylamino group represented by $R^3$, $R^4$ and $R^5$ include lower alkanoylamino groups such as an acetylamino group, a propionylamino group, etc., aryloylamino groups such as a benzoylamino group, etc. The aralkyl groups represented by $R^6$ and $R^7$ include a benzyl group, a phenethyl group, etc. The substituted lower alkyl groups represented by $R^6$ and $R^7$ include halogeno-lower alkyl groups such as a β-chloroethyl group, a β-bromoethyl group, a β-hydroxy-γ-chloropropyl group, etc., cyano-lower alkyl groups such as β-cyanoethyl group, etc., lower alkoxy-lower alkyl groups such as a β-methoxyethyl group, a β-ethoxyethyl group, a γ-methoxypropyl group, etc., lower alkoxycarbonyl-lower alkyl groups such as a β-methoxycarbonylethyl group, a β-ethoxycarbonylethyl group, a β-n-butoxycarbonylethyl group, etc., hydroxy-lower alkyl groups such as a β-hydroxyethyl group, a β-hydroxypropyl group, a β-hydroxybutyl group, etc., and acyloxy-lower alkyl groups such as a β-acetoxyethyl group, a β-acetoxypropyl group, a β-propionyloxyethyl group, etc. The mono- or di-alkylamino group having 1-6 carbon atoms and represented by X include a methylamino group, an ethylamino group, a linear or branched propylamino group, butylamino group pentylamino group and hexylamino group, a dimethylamino group, a diethylamino group, a dipropylamino group, etc.

The cellulose-containing fibers to be dyed with the dye of the invention are natural fibers such as of cotton, hemp, etc., semi-synthetic fibers such as viscose rayon, cuprammonium rayon, etc., and partially aminated or partially acylated, modified cellulose fibers. As a matter of course, these fibers may be in the form of woven or non-woven fabrics. Furthermore, mixed fibers or blended fiber fabrics which are made of the abovementioned fibers and other types of fibers such as polyester fiber, cation-dyeable polyester fiber, anion-dyeable polyester fiber, urethane fiber, di- or triacetate fiber, etc., are usable. Of these, the cellulose fibers and the mixed fibers or mixed fiber fabrics of cellulose fibers and polyester fibers are more effective for application of the dye of the invention.

The cellulose-containing fibers are dyed with the dye of the invention preferably by the pad dyeing or the print dyeing. Additionally, the wet or dry, transfer printing method is also usable.

In the pad dyeing and print dyeing of cellulose fibers, it is the general practice to use direct dyes, sulfur dyes, vat dyes, naphthol dyes, water-soluble reactive dyes, and the like dyes. However, all of the first four dyes have problems in wet color fastness and color fastness to rubbing since they are not deposited by covalent bond with the cellulose fibers. This is why water-soluble reactive dyes have been widely used in practice. However, it is known that the water-soluble reactive dyes involve the following problems.

1. The percentage of utilization of dye is as low as about 50–70%.

2. In order to develop good wet color fastness which is inherent to the water-soluble reactive dye, the unreacted dye has to be completely removed from the fibers, requiring large amount of water in the washing step. This is naturally accompanied by an additional treatment of colored waste liquor.

On the other hand, in the pad dyeing and print dyeing of mixed materials made of polyester fibers and cellulose fibers which are completely different in hydrophilicity, the polyester fibers are dyed with disperse dyes and the cellulose fibers are dyed with the aforeindicated various types of dyes. From a viewpoint of excellency in wet color fastness and color fastness to rubbing of the dyed articles, there are widely used combinations of disperse dyes and water-soluble reactive dyes. Recently, intense attention has been shown towards a one bath and one stage pad dyeing process and a one phase printing process from a viewpoint of economy. However, these dyeing processes are known to present the following problems.

1. About 2 wt % of an alkali, e.g. sodium carbonate, is usually added to a padding bath or a printing colored paste as a catalyst for reaction of the soluble reactive dye and it serves to decompose disperse dyes upon thermal fixing, thus lowering the dyeing intensity or yellowing the cellulose to render the hue unclear.

2. Since the water-soluble reactive dye which has deposited on polyester fibers is not utilized, the rate of utilization of the reactive dye becomes lower than that in the case where cellulose fibers alone are dyed. Thus, an excess of the water-soluble reactive dye must be used.

3. In order to completely remove from fibers the unreacted water-soluble reactive dye and the non-fixed disperse dye which are factors of lowering color fastness to light and wet color fastness of dyed articles, it goes without saying that large amount of washing water is necessary. When washed, the non-fixed disperse dye which has once removed from the fibers acts to stain the cellulose fibers or portions which are wanted to remain as white spots.

Further, there are known methods of dyeing these mixed materials with a single dye. One of the methods is known as a so-called pigment resin process wherein a pigment is deposited on fibers by means of a resin. However, this process presents problems with respect to texture and color fastness to rubbing of dyed articles. Another process is also known in which a nonionic dye of a specific type which is slightly greater in molecular weight than disperse dyes for ordinary polyester fibers is used. This dye is deposited on cellulose fibers in adsorbed state, so that when it is allowed to stand over long time, the bleeding phenomenon takes place. Because of a greater molecular weight than those of ordinary disperse dyes, the dye shows a great temperature dependency upon fixing and is low in reproducibility.

These prior art problems can be solved when using the dye represented by the general formula (I).

The dyeing process will be described in detail.

In order to carry out the dyeing, the dye of the general formula (I) should preferably be finely dispersed in a medium in a particle size ranging about $0.5\mu–2\mu$. This is feasible by a variety of methods including a method in which the dye is finely dispersed in water by the use of a nonionic or anionic dispersant such as, for example, sodium ligninsulfonate or a water-soluble dispersant such as a sodium salt of naphthalenesulfonic acid-formalin condensate in a powdering machine such as a sand grinder, a mill or the like, a method of finely dispersing the dye by the use of a water-sparingly-soluble or insoluble dispersant such as compounds of sulfosuccinate, nonylphenol, etc., which are addition reacted with a small moles of ethylene oxide in a solvent other than water, e.g. alcohols such as ethyl alcohol, isopropyl alcohol, polyethylene glycol, etc., ketones such as acetone, methyl ethyl ketone, etc., hydrocarbons such as n-hexane, toluene, xylene, mineral turpentine, etc., halogenated hydrocarbons such as tetrachloroethylene, etc., esters such as ethyl acetate, butyl acetate, etc., ethers such as dioxane, tetraethylene glycol dimethyl ether, etc., or mixed solvents thereof, and a method of finely dispersing the dye in a mixed solvent of water and a solvent chosen from the above-mentioned solvents and miscible with water in arbitrary ratio.

In the finely dispersing process, high molecular weight compounds soluble in the dispersing media or surface active agents having functions other than the dispersing action may be added.

Though this dispersion of the finely dispersed dye may be used as it is as a padding bath for the padding process or as a printing colored paste for the printing process, the dye dispersion is usually diluted, for use as the padding bath and the printing colored paste, with water or a mixed system of solvents miscible with water in arbitrary ratio and water, or with an O/W emulsion or a W/O emulsion in which the oil layer is composed of petroleum hydrocarbons such as mineral turpentine, etc., or hydrogenated hydrocarbons such as tetrachloroethylene, etc., in such a ratio that a desired concentration of the dye is attained.

In order to conveniently prepare the padding bath or the printing colored paste using the dye according to the invention, a swelling agent for cellulose fibers or an acid binder such as alkali metal carbonates for the purpose of accelerating the reaction between the dye and cellulose fibers may be added. Further, in order to prevent the dye migration at the time of the pad dyeing, or to control the viscosity of the colored paste, a viscosity improver, e.g. water soluble polymers such as sodium alginate, may be added.

The swelling agent for cellulose and the acid binder are not necessarily incorporated into the padding bath or the printing colored paste and may be deposited on fibers in advance.

The swelling agents for cellulose fibers may be any of substances which have a boiling point above 150° C. and which have an effect of swelling the cellulose fibers and are, for example, ureas such as N,N,N',N'-tetramethylurea and polyhydric alcohols such as polyethylene glycol, polypropylene glycol, etc. and derivatives thereof.

Of these, the derivatives of the polyhydric alcohols, e.g. polyethylene glycol, polypropylene glycol and the like alcohols with an average molecular weight of about 200-500 whose hydroxy groups at both ends are dimethylated or diacetylated and are thus unreacted with the reactive groups of the dye, are preferable as the swelling agent. The amount of the swelling agent is suitably in the range of about 5-25 wt %, preferably about 8-15 wt %, of the padding bath or printing colored paste.

The acid binders include, aside from the alkali metal carbonates, alkali metal bicarbonates, alkali metal phosphates, alkali metal borates, alkali metal silicates, alkali metal hydroxides, alkali metal aliphatic salts such as alkali metal acetates, and alkaline precursor compounds such as sodium trichloroacetate, sodium acetoacetate, etc. which are able to generate an alkali when heated in the presence of water.

It should be noted that the monofluorotriazinyl group to be the reactive group of the dye of the invention is much more reactive than a monochlorotriazinyl group, so that the amount of the acid binder can be considerably reduced and the decomposition of the dye and the yellowing of the fibers at the time of dyeing can be prevented. The amount of the acid binder is in the range of 0-0.1 wt % of the padding bath or printing colored paste in the case of the monofluoromonoalkoxytriazinyl group and in the range of about 0.1-0.2 wt % in the case of the monofluoroaminotriazinyl group.

The dyeing of the fibers with the dye of the invention is feasible by usual manners, for instance, by a method in which the padding bath or the printing colored paste prepared according to the foregoing method is dipped with or printed on a cellulose fiber-containing material, dried, thermally treated with hot air or superheated steam of 160°-220° C. for 30 seconds-10 minutes, and finally washed with hot water containing a surface active agent or washed in a washing bath of an O/W or W/O emulsion whose oil layer is made of halogenated hydrocarbons such as tetrachloroethylene, or washed by a usual dry cleaning system.

By the method there can be obtained a dyed article which is clear and is dyed uniformly and which shows good color fastness to light and wet color fastness.

The present invention will be particularly illustrated by way of examples, which should not be construed as limiting thereto the present invention.

EXAMPLE 1:

A dye composition composed of 15 g of a disazo dye represented by the following structural formula, 15 g of naphthalenesulfonic acid-formaldehyde condensate, and 70 ml of water was placed in a paint shaker used as a finely dispersing machine to prepare a dye dispersion:

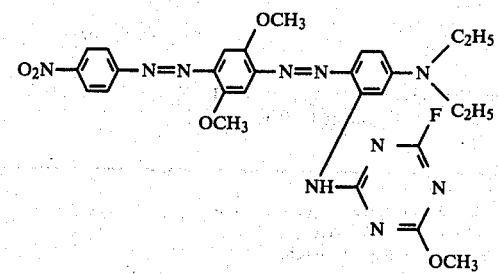

The thus prepared dye dispersion was used to prepare a printing colored paste of the following formulation:

| | |
|---|---|
| dye dispersion | 6.5 g |
| 5% sodium alginate aqueous solution | 55 g |
| polyethylene glycol dimethyl ether (average molecular weight 400) | 9 g |
| sodium carbonate | 0.05 g |
| water | balance |
| | 100 g |

Then, a polyester/cotton (mixing ratio 65/35) mixed cloth was printed by the use of a screen printing machine, followed by preliminarily drying at 80° C. for 3 minutes and dry fixing at 215° C. for 90 seconds. Thereafter, the cloth was washed with water and subjected to soaping with a washing containing 1 g/l of sodium hydroxide and 2 g/l of a nonionic active agent (Scourol #900 (commercial name), product of Kao Soap Co., Ltd.) in a bath ratio of 1:30 for 20 minutes thereby obtaining a blue-colored dye cloth showing excellent color fastness to light.

Part of the dye cloth was then treated with 70% sulfuric acid to dissolve away the cotton alone thereby obtaining the polyester fibers while another part of the cloth was treated with hexafluoroisopropanol to dissolve away the polyester fibers alone to obtain the cellulose fibers. These fibers were compared in hue with each other and it was found that the solid dyeing effect was very good and the color fastness to light of the respective dye fibers was also good.

The dye used in this Example was prepared by diazotizing 4-amino-2,5-dimethoxy-4'-nitroazobenzene by an ordinary manner and then coupling with 3-(3'-fluoro-5'-methoxytriazinyl) amino-N,N-diethylaniline. This product had a $\lambda_{max}$ (acetone) of 586 nm.

EXAMPLE 2

A dye composition composed of 15 g of a disazo dye represented by the following structural formula, 15 g of naphthalenesulfonic acid-formaldehyde condensate, and 70 ml of water was placed in a sand grinder used as a finely dispersing machine to prepare a dye dispersion:

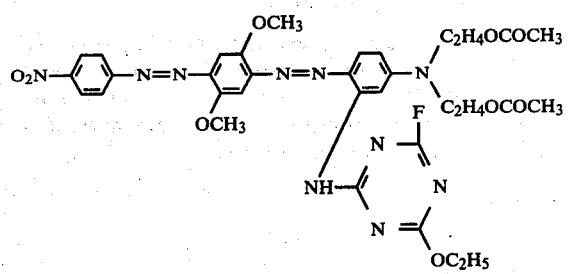

The dispersion was used to prepare a printing colored paste of the following formulation:

| | |
|---|---|
| dye dispersion | 7 g |
| 5% sodium alginate aqueous solution | 55 g |
| propylene glycol diacetate (average molecular weight 300) | 12 g |
| sodium carbonate | 0.05 g |
| water | balance |
| | 100 g |

The paste was printed on a commercialized cotton broad cloth (cotton count 40) by the use of a screen printing machine, followed by preliminarily drying at 80° C. for 3 minutes and treating with superheated steam of 185° C. for 7 minutes. Then, the washing treatment was conducted in the same manner as in Example 1 thereby obtaining a blue-colored dye cloth which was excellent in color fastness to light and wet color fastness.

The dye used in this example was prepared by diazotizing 4-amino-2,5-dimethoxy-4'-nitroazobenzene by an ordinary manner and coupling with 3-(3'-fluoro-5'-ethoxytriazinyl)amino-N,N-di (β-acetoxyethyl)aniline. The product had a $\lambda_{max}$ (acetone) of 569 nm.

EXAMPLE 3

A dye composition composed of 10 g of a disazo dye represented by the following structural formula, 2 g of polyoxyethylene glycol nonylphenyl ether (HLB 8.9), and 88 g of diethylene glycol diacetate was milled in a paint conditioner used as a finely dispersing machine to prepare a dye ink:

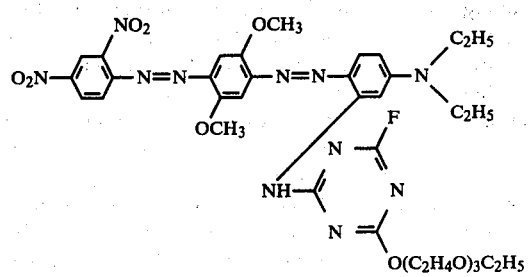

10 g of the dye ink and 55 g of mineral turpentine were mixed and the mixture was gradually added to 35 g of an aqueous solution of the following formulation while agitating by means of a homogenizer and continued to agitate until the mixture became uniform thereby obtaining a viscous O/W emulsion colored paste.

| | |
|---|---|
| water | 31 g |
| Repitol G | 3.8 g |

| | |
|---|---|
| (commercial name, product of Daiichi Industrial Chemicals Co., Ltd., nonionic active agent of specific type) | |
| sodium trichloroacetate | 0.2 g |
| | 35 g |

This colored paste was used to print a polyester/cotton (mixing ratio 65/35) blended cloth therewith by the use of a screen printing machine, dried at 100° C. for 2 minutes, and treated with superheated steam at 175° C. for 7 minutes. Thereafter, the painted cloth was washed in a hot tetrachloroethylene bath containing small amount of water and dried to obtain a blue-colored dye cloth which was excellent in wet color fastness and free of straining white portions.

The dye used in this example was prepared by diazotizing 4-amino-2,5-dimethoxy-2',4'-dinitroazobenzene by an ordinary manner and then coupling with 3-(3'-fluoro-5'-ethoxyethyoxyethoxyethoxytriazinyl)amino-N,N-diethylaniline. The dye product had a $\lambda_{max}$ (acetone) of 612 nm.

EXAMPLE 4

A dye composition composed of 16 g of a dye represented by the following structural formula, 10 g of polyoxyethylene glycol nonylphenyl ether (HLB 13.3), and 74 g of water was finely dispersed by means of a sand grinder to prepare a dye dispersion:

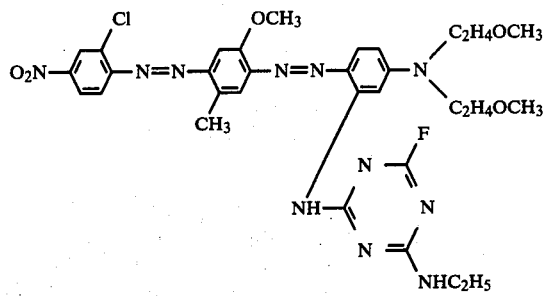

The dye dispersion was used to prepare a padding bath of the following formulation:

| | |
|---|---|
| dye dispersion | 6 g |
| tetraethylene glycol dimethyl ether | 15 g |
| sodium trichloroacetate | 0.2 g |
| water | balance |
| | 100 g |

Then, a polyester/rayon (mixing ratio 65/35) blended cloth was dipped into the bath and squeezed at a squeezing ratio of 75%, followed by drying at 100° C. for 2 minutes and dry fixing at 200° C. for 1 minute. The thus treated cloth was washed in a hot ethanol bath to obtain a blue-colored dye cloth which was evenly dyed and was excellent in wet color fastness.

The dye used in this example was prepared by diazotizing 4-amino-2-methyl-5-methoxy-2'-chloro-4'-nitroazobenzene by a usual manner and then coupling with 3-(3'-fluoro-5'-ethylamino-triazinyl)amino-N,N-di-(β-methoxyethyl)aniline. The dye product had a $\lambda_{max}$ (acetone) of 569 nm.

EXAMPLE 5:

Example 1 was repeated except that a nylon/rayon (mixing ratio 50/50) blended cloth was used and the dry fixing temperature was 185° C., thereby obtaining a blue-colored printed cloth showing good wet color fastness. The microscopic observation revealed that the printed cloth was dyed uniformly.

EXAMPLE 6

A commercialized cotton broad (cotton count 40) was dipped into a treating bath composed of 0.14 g of sodium carbonate, 25 g of tetraethylene glycol dimethyl ether and 75 g of water, squeezed at a squeezing rate of 70%, and then dried at 50° C. for 5 minutes.

On the other hand, 6 g of the dye used in Example 1, 8 g of ethyl cellulose and 86 g of isopropyl alcohol were milled in a paint conditioner to prepare an ink. The ink was printed on a coated paper for gravure to give a transfer sheet.

The cotton cloth was superposed on the transfer sheet, which was heated and pressurized under conditions of 10 mmHg, 210° C. and 100 g/cm$^2$. G for 60 seconds by the use of a reduced pressure transfer machine, Ariloper FV 2-1019 (made by Naomoto Ind. Co., Ltd.), and transferred and fixed to obtain a blue-colored dye cloth.

The dyed cloth was washed with hot N,N-dimethylformamide but stripping off of the dye was scarecely recognized.

EXAMPLE 7

The disazo dyes indicated in the following Table were used to print in accordance with the procedure of Example 1 using as a deacidifying agent sodium carbonate in an amount of 0.05 wt % of the printing paste in case where the reactive group is a monofluoromonoalkoxytriazinyl group or sodium carbonate in an amount of 0.2 wt % of the printing paste in case where the reactive group is a monofluoromonoaminotriazinyl group. The color tone of the resulting dyed clothes and the $\lambda_{max}$ (acetone) of the employed disazo compounds are shown in the Table.

TABLE

General Formula

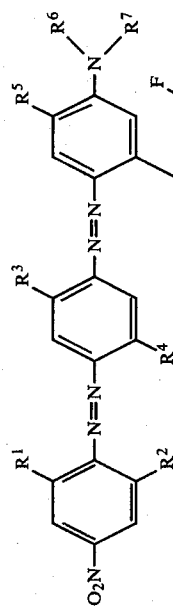

| No. | R¹ | R² | R³ | R⁴ | R⁵ | R⁶ | R⁷ | X | dyeing color tone (polyester/cotton) | λmax of dye (acetone) nm |
|---|---|---|---|---|---|---|---|---|---|---|
| 1 | H | H | H | H | H | $C_2H_5$ | $C_2H_5$ | $OCH_3$ | reddish blue | 530 |
| 2 | " | " | " | " | " | " | " | $NHCH_3$ | " | 531 |
| 3 | " | " | " | Cl | " | " | " | $OCH_3$ | " | 528 |
| 4 | " | " | " | Br | " | " | " | $OC_2H_4OCH_3$ | " | 529 |
| 5 | " | " | " | $CH_3$ | " | $C_3H_7(n)$ | $C_3H_7(n)$ | $N(CH_3)_2$ | " | 535 |
| 6 | " | " | " | $C_2H_5$ | " | $C_4H_9(n)$ | $C_4H_9(n)$ | $OC_2H_5$ | " | 537 |
| 7 | " | " | $OCH_3$ | $OCH_3$ | " | $C_2H_5$ | $C_2H_5$ | $OC_3H_7(i)$ | " | 540 |
| 8 | " | " | " | " | " | $CH_2CH=CH_2$ | $CH_2CH=CH_2$ | $OCH_3$ | blue | 586 |
| 9 | " | " | " | " | " | $C_2H_5$ | $C_2H_5$ | $OC_2H_5$ | " | 585 |
| 10 | " | " | " | " | " | $CH_2$—⌬ | $CH_2$—⌬ | $OCH_3$ | " | 580 |
| 11 | " | " | " | $OCH_3$ | " | $C_2H_4Cl$ | $C_2H_4Cl$ | $NHC_2H_5$ | " | 581 |
| 12 | " | " | " | " | " | $C_2H_4OCH_3$ | $C_2H_4OCH_3$ | $OC_2H_5$ | " | 575 |
| 13 | " | " | " | " | $OCH_3$ | $C_2H_5$ | $C_2H_5$ | $OCH_3$ | " | 599 |
| 14 | " | " | " | " | $OC_2H_5$ | $C_2H_4CN$ | $C_2H_4CN$ | $OC_2H_5$ | " | 590 |
| 15 | " | " | " | " | H | $C_2H_4COOCH_3$ | $C_2H_4COOCH_3$ | $OCH_3$ | " | 580 |
| 16 | " | " | " | " | " | $C_2H_4OH$ | $C_2H_4OCH_3$ | $N(C_2H_5)_2$ | " | 581 |
| 17 | " | " | " | " | " | $C_2H_4OCOCH_3$ | $C_2H_4OCOCH_3$ | $OC_3H_7(n)$ | " | 583 |
| 18 | " | " | $CH_3$ | H | " | $C_2H_5$ | $C_2H_5$ | $OCH_3$ | reddish blue | 533 |
| 19 | " | " | " | " | " | $C_3H_7(n)$ | $C_3H_7(n)$ | $OC_2H_5$ | " | 531 |
| 20 | " | " | $C_2H_5$ | Cl | " | $C_2H_4CN$ | $C_2H_5$ | $O(C_2H_4O)_2CH_3$ | " | 530 |
| 21 | " | " | Cl | " | " | H | H | $O(C_3H_6O)_2CH_3$ | " | 532 |
| 22 | " | " | Br | " | " | " | $C_4H_9(n)$ | $OC_3H_7(i)$ | " | 533 |
| 23 | " | " | $CH_3$ | $CH_3$ | " | " | $C_2H_4OCH_3$ | $OC_4H_9(t)$ | " | 535 |
| 24 | " | " | " | " | " | " | $CH_2$—⌬ | $NHC_5H_{11}(n)$ | " | 536 |
| 25 | " | " | $C_2H_5$ | $C_2H_5$ | $OCH_3$ | " | $CH_2CH=CH_2$ | $NH_2$ | blue | 557 |
| 26 | " | " | $OC_2H_5$ | $OC_2H_5$ | $CH_3$ | $C_2H_4Cl$ | $C_2H_4Cl$ | $OCH_3$ | " | 585 |

TABLE-continued

General Formula:

[Structure: O₂N-C₆H₃(R¹)(R²)-N=N-C₆H₂(R³)(R⁴)-N=N-C₆H₂(R⁵)(NR⁶R⁷)- with pyrimidine ring bearing F and X substituents, connected via NH]

| No. | R¹ | R² | R³ | R⁴ | R⁵ | R⁶ | R⁷ | X | dyeing color tone (polyester/cotton) | λmax of dye (acetone) nm |
|-----|----|----|----|----|----|----|----|----|----|----|
| 27 | " | " | OC₂H₄OCH₃ | OC₂H₄OCH₃ | C₂H₅ | CH₃ | C₂H₄OCH₃ | " | " | 584 |
| 28 | " | " | OC₂H₄OC₂H₅ | OC₂H₄OC₂H₅ | OC₂H₅ | " | C₂H₄OH | N(CH₃)₂ | " | 583 |
| 29 | " | " | OCH₃ | OCH₃ | Cl | C₂H₅ | C₂H₅ | NHC₆H₁₃(n) | " | 578 |
| 30 | " | " | " | " | OC₂H₄OCH₃ | " | " | OC₂H₅ | " | 590 |
| 31 | " | " | " | " | Br | CH₂CH(OH)CH₂Cl | CH₂CH(OH)CH₂Cl | O(C₂H₄O)₂CH₃ | " | 575 |
| 32 | " | " | NHCOCH₃ | H | " | C₂H₄COOCH₃ | C₂H₄COOCH₃ | OCH₃ | reddish blue | 532 |
| 33 | " | " | H | NHCOCH₃ | " | H | C₂H₄CN | C₂H₅ | " | 535 |
| 34 | " | " | " | " | " | C₂H₄OCOCH₃ | C₂H₄OCOCH₃ | O(C₂H₄O)₅CH₃ | " | 542 |
| 35 | " | " | OCH₃ | " | OCH₃ | C₂H₅ | C₂H₅ | O(C₃H₆O)₄CH₃ | blue | 590 |
| 36 | " | " | " | " | Cl | CH₂CH(OH)C₂H₅ | CH₂CH(OH)C₂H₅ | NHCH₃ | " | 587 |
| 37 | " | " | OC₂H₅ | NHCO-C₆H₅ | H | C₄H₉(n) | C₄H₉(n) | OCH₃ | " | 585 |
| 38 | " | " | H | NHCOC₂H₅ | " | CH₂-C₆H₅ | C₂H₅ | OC₂H₅ | reddish blue | 530 |
| 39 | " | " | NHCOCH₃ | NHCOCH₃ | " | H | " | NH-C₆H₅ | blue | 599 |
| 40 | " | " | OC₂H₄OCH₃ | NHCO-C₆H₅ | " | " | C₃H₇(i) | OCH₃ | " | 597 |
| 41 | " | " | H | H | " | C₂H₄OC₂H₅ | C₂H₄OC₂H₅ | OC₃H₇(i) | reddish blue | 530 |
| 42 | " | " | H | " | OCH₃ | C₂H₄Cl | C₂H₄Cl | OC₂H₄OCH₃ | " | 534 |
| 43 | " | " | " | " | H | C₂H₄OCOC₂H₅ | C₂H₄OCOC₂H₅ | NH-C₆H₅ | " | 530 |

TABLE-continued

General Formula

| No. | R¹ | R² | R³ | R⁴ | R⁵ | R⁶ | R⁷ | X | dyeing color tone (polyester/cotton) | $\lambda_{max}$ of dye (acetone) nm |
|---|---|---|---|---|---|---|---|---|---|---|
| 44 | " | " | C₄H₉(n) | C₄H₉(n) | Br | C₂H₄OCOCH₃ | C₂H₄OCOCH₃ | OCH₃ | " | 535 |
| 45 | " | " | OC₃H₇(n) | OC₃H₇(n) | H | C₂H₄OCOCH₃ | C₂H₄OCOCH₃ | OC₂H₅ | blue | 579 |
| 46 | " | " | OC₂H₅ | OC₂H₅ | " | C₂H₄Br | C₂H₄Br | N(C₂H₅)₂ | " | 580 |
| 47 | " | Cl | Br | Br | " | C₂H₅ | C₂H₅ | N(C₃H₇-n)₂ | reddish blue | 531 |
| 48 | " | Br | Cl | Cl | " | " | " | OCH₃ | " | 532 |
| 49 | NO₂ | COOC₂H₅ | H | H | " | " | " | " | " | 533 |
| 50 | " | H | " | CH₃ | " | " | " | OC₂H₅ | " | 531 |
| 51 | " | " | " | H | " | C₂H₄CN | C₂H₄CN | NHCH₃ | " | 533 |
| 52 | " | " | OCH₃ | OCH₃ | OCH₃ | C₂H₄OCOCH₃ | C₂H₄OCOCH₃ | NHC₂H₅ | " | 534 |
| 53 | " | " | Cl | Cl | H | C₂H₅ | C₄H₉(n) | NHC₆H₁₃(n) | blue | 610 |
| 54 | " | " | " | " | " | " | " | OC₂H₄OCH₃ | reddish blue | 530 |
| 55 | CN | " | Br | Br | " | " | C₂H₄— | OC₂H₄OC₂H₅ | " | 528 |
| 56 | " | " | OCH₃ | CH₃ | " | " | CH₂CH=CH₂ | OCH₃ | blue | 608 |
| 57 | NO₂ | " | H | H | H | C₂H₄COOCH₃ | C₂H₄COOCH₃ | " | reddish blue | 535 |
| 58 | CN | H | " | " | " | C₃H₇(n) | C₃H₇(n) | OC₂H₅ | " | 534 |
| 59 | Cl | " | Cl | Cl | " | C₄H₉(n) | C₄H₉(n) | OC₄H₉(n) | " | 531 |
| 60 | CF₃ | " | H | NHCOCH₃ | " | C₂H₅ | C₂H₅ | OC₃H₇(n) | blue | 551 |
| 61 | " | " | " | NHCO— | " | " | " | OCH₃ | " | 560 |
| 62 | COOCH₃ | " | " | H | " | " | " | —NH— | reddish blue | 532 |
| 63 | CH₃ | " | OCH₃ | OCH₃ | " | C₂H₄OC₄H₉(n) | C₂H₄OC₄H₉(n) | O(C₂H₄O)₂CH₃ | blue | 577 |
| 64 | C₂H₅ | " | OC₂H₅ | OC₂H₅ | " | C₂H₄OCH₃ | C₂H₄OCH₃ | O(C₃H₆O)₂CH₃ | " | 575 |
| 65 | NO₂ | " | H | H | " | C₂H₄OH | C₂H₄OH | OCH₃ | reddish blue | 533 |
| 66 | Br | NO₂ | CH₃ | CH₃ | " | " | " | OC₂H₅ | blue | 557 |

TABLE-continued

General Formula:

[Structure: O₂N-C₆H₃(R¹)(R²)-N=N-C₆H₂(R³)(R⁴)-N=N-C₆H₂(R⁵)(NR⁶R⁷)- with NH linked to triazine ring bearing F and X]

| No. | R¹ | R² | R³ | R⁴ | R⁵ | R⁶ | R⁷ | X | dyeing color tone (polyester/cotton) | λmax of dye (acetone) nm |
|---|---|---|---|---|---|---|---|---|---|---|
| 67 | NO₂ | Cl | H | Cl | OC₂H₅ | CH₂⌬ | CH₂⌬ | NHC₄H₉(t) | " | 541 |
| 68 | COOC₄H₉(n) | H | " | OC₂H₄OCH₃ | H | C₂H₅ | C₂H₅ | O(C₂H₄O)₂CH₃ | reddish blue | 533 |
| 69 | Br | COOCH₃ | " | H | " | " | " | OCH₃ | " | 545 |
| 70 | NO₂ | CN | " | " | " | " | " | OC₂H₄OCH₃ | " | 600 |
| 71 | " | CF₃ | " | " | " | C₂H₄COOC₄H₉(n) | C₂H₄COOC₄H₉(n) | OC₂H₅ | blue | 599 |
| 72 | OCH₃ | Br | " | " | " | C₂H₅ | C₂H₅ | NHCH₃ | reddish blue | 534 |

What is claimed is:

1. A disazo dye for cellulose-containing fibers represented by the general formula

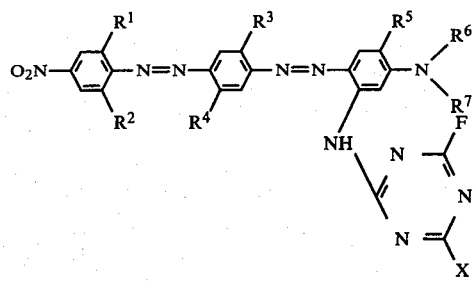

in which $R^1$ and $R^2$ independently represent a hydrogen atom, a halogen atom, a nitro group, a cyano group, a trifluoromethyl group, a lower alkoxycarbonyl group, a lower alkyl group or a lower alkoxy group; $R^3$, $R^4$ and $R^5$ independently represent a hydrogen atom, a halogen atom, a lower alkyl group, a lower alkoxy group, a lower alkoxy-lower alkoxy group or an acylamino group, $R^6$ and $R^7$ independently represent a hydrogen atom; an allyl group, an aralkyl group, and a lower alkyl group which may be substituted with a halogen atom, a cyano group, a lower alkoxy group, a lower alkoxycarbonyl group, a hydroxy group or an acyloxy group; and X represents an amino group, a mono- or di-alkylamino group having 1-6 carbon atoms in total, an anilino group, a lower alkoxy group or a $-O-(R^8O)_n-R^9$ in which $R^8$ represents an ethylene group or a propylene group, $R^9$ represents a methyl group or an ethyl group, and n is an integer of 1-5.

* * * * *